United States Patent [19]

Hurd et al.

[11] Patent Number: 5,201,404
[45] Date of Patent: Apr. 13, 1993

[54] APPARATUS AND METHOD FOR DISTRIBUTING PRODUCT ON A CONVEYER

[75] Inventors: Ronald D. Hurd, Minnetonka; James R. Wetzel, Arden Hills, both of Minn.

[73] Assignee: General Mills, Inc., Minneapolis, Minn.

[21] Appl. No.: 767,439

[22] Filed: Sep. 30, 1991

[51] Int. Cl.⁵ .............................................. B65G 47/74
[52] U.S. Cl. ..................................... 198/636; 198/633
[58] Field of Search ............... 198/534, 633, 635, 636, 198/599, 836.1

[56] References Cited

U.S. PATENT DOCUMENTS

| | | | |
|---|---|---|---|
| 1,397,657 | 11/1921 | Rasmussen | 198/635 X |
| 2,699,249 | 1/1955 | Milliken, Jr. et al. | 198/636 X |
| 2,931,521 | 4/1960 | Hartley | 198/599 X |
| 3,193,080 | 7/1965 | Speaker | 198/636 X |

FOREIGN PATENT DOCUMENTS

| | | | |
|---|---|---|---|
| 0211052 | 7/1984 | Fed. Rep. of Germany | 198/636 |
| 2523096 | 9/1983 | France | 198/633 |
| 0569497 | 9/1977 | U.S.S.R. | 198/633 |
| 1105419 | 7/1984 | U.S.S.R. | 198/636 |
| 1207933 | 1/1986 | U.S.S.R. | 198/636 |

Primary Examiner—Robert P. Olszewski
Assistant Examiner—James R. Bidwell
Attorney, Agent, or Firm—John A. O'Toole

[57] ABSTRACT

An apparatus (10) for evenly distributing coated cereal pieces across the width of a conveyer is disclosed including a steep angled, V-shaped plow (24) supported in varying angular positions by saddles (38) above the conveyer. Specifically, three saddles (38) slideably support a semicircular shaped carrier (12) secured to and between the first and second legs (26, 28) of the plow (24). A connector arm (66) is connected to a leg (28) of the plow (24) for moving the carrier (12) and the plow (24) secured thereto along an arc having a center downstream of the interconnection of the legs (26, 28) of the plow (24) and in the preferred form at the center of the semicircular shape of the carrier (12). The saddles (38) are vertically, adjustably secured to a support arm (46) which in turn can be raised or lowered relative to the conveyer. The plow (24) is positioned to engage the product pile on the conveyer and due to the steep angle of the legs (26, 28) of the plow (24) and the Teflon ® nature thereof, the coated cereal pieces spread quickly and evenly across the width of the conveyer. The angular position of the plow (24) is varied to conform to the variations in the product pile on the conveyer.

14 Claims, 1 Drawing Sheet

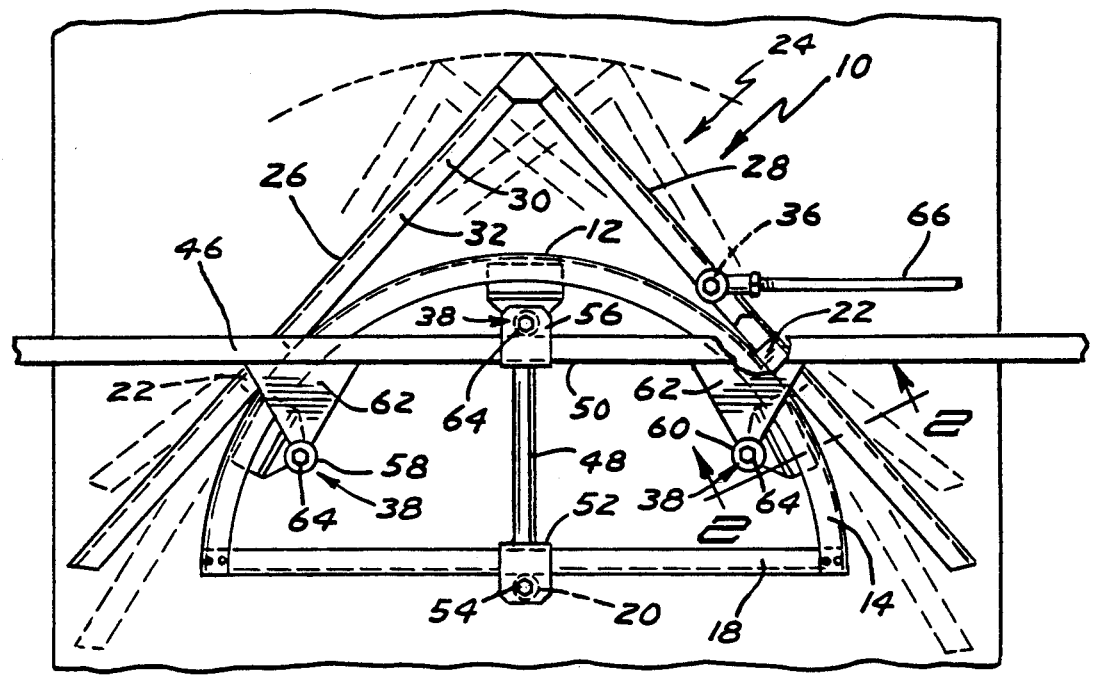
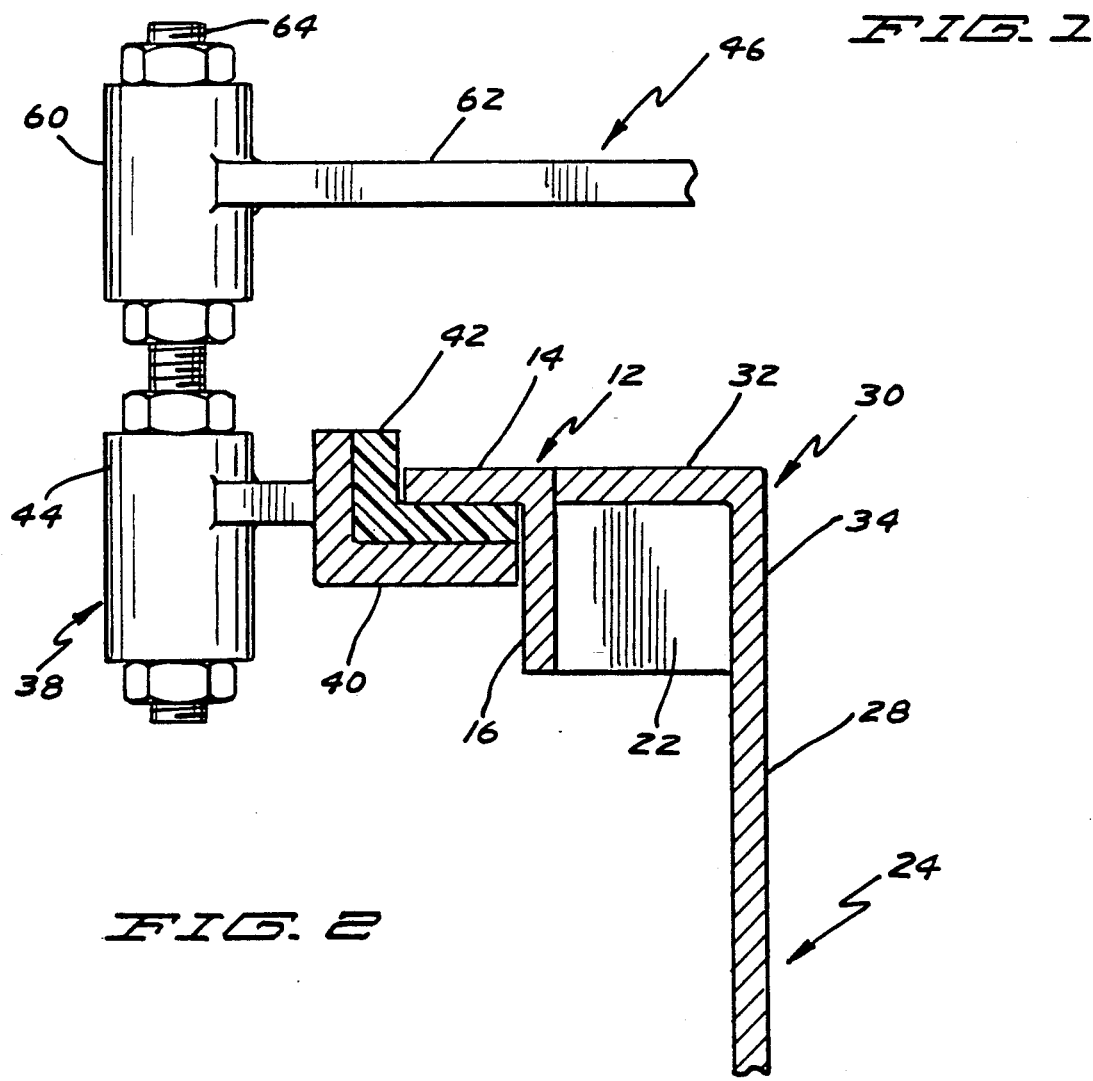

APPARATUS AND METHOD FOR DISTRIBUTING PRODUCT ON A CONVEYER

BACKGROUND

The present invention generally relates to apparatus and methods for distributing product on a conveyer, particularly to apparatus and methods for distributing product evenly across the width of a conveyer, and more particularly to apparatus and methods for distributing coated cereal pieces evenly across the width of a conveyer.

In the manufacture of cereal, the cereal pieces are often coated with a topical sweetener solution and then the "slurry" coated cereal pieces must be dried to remove the added moisture associated with the topical sweetener solution. In practice, the coated cereal pieces are deposited by a rotating enrober onto a conveyer which then advances the cereal pieces into a dryer. It can then be appreciated that the coated cereal pieces are deposited on the conveyer as a continuous pile, making it necessary to distribute the coated cereal pieces from the pile across the width of the conveyer prior to entry into the dryer. Minor variations in processing conditions can result in the pile being deposited at various positions across the width of the conveyer. While generally useful, existing cereal distribution apparatus induce certain problems which result in reduced product quality to the consumer.

Particularly, there are generally two types of distribution apparatus in practice, a bias blade plow and a shallow angle, non-pivoting, V-shaped plow. The bias blade plow was a single steel sheet or blade angled across the width of the conveyer to the dryer at an angle on the order of 30° to a perpendicular line across the width of the conveyer or in other words on the order of 120° to the longitudinal axis of the conveyer. The blade is attached to steel tubing, and jacks are attached to the tubing to raise/lower the blade via a manual hand wheel. The product is dropped on one side of the conveyer and is spread generally over the entire width of the conveyer by traveling downstream along the blade. Unfortunately, the bias blade plow spreads the cereal pieces unevenly in both width and thickness. As a result of entering the dryer unevenly distributed on the conveyer, several types of problems are experienced. Problems in the finished product include especially poor product texture resulting from non-uniform drying. Moreover, throughput of the dryer is undesirably reduced as is drying efficiency.

The V-shaped plow includes first and second legs arranged at a fixed, shallow angle on the order of 132°. The V-shaped plow is attached to an arm, and jacks are attached to the arm to raise/lower the V-shaped plow via a manual hand wheel. The product is dropped generally in the center of the conveyer and is spread generally over the entire width of the conveyer by traveling downstream along the first and second legs of the V-shaped plow. To compensate for centerline differences between the conveyer and the product pile coming off the rotating enrober, a manually adjustable blade referred to as a rudder was pivotally mounted at the interconnection of the first and second legs and projecting therefrom longitudinally to the conveyer. The rudder is pivoted such that its free end is located generally at the centerline of the product pile to direct product laterally across the dryer width. However, while useful, the rudder is difficult to adjust to obtain even spreading. Moreover, once even spreading is attained maintenance is difficult due in turn to variances in the product pile centerline resulting from small processing variances such as the particular product being distributed and the throughput rate of the product. Further, the rudder also generated pockets located in front of and behind the rudder and in which product was trapped, thus causing product clumping or agglomerates. Such agglomerates would eventually be released from the pockets and travel on the conveyer to the dryer and could possibly reach the packaging area and ultimately the consumer resulting in complaints due to quality.

Further, as the result of the difficulties in distributing the product on the conveyer and the problems resulting therefrom including the non-uniform drying of the cereal, the capacity of the cereal production line was capped or bottlenecked by the ability to spread the cereal on the conveyer. Reductions in dryer efficiency can also result.

Accordingly, in the production of cereal, it is imperative that the coated cereal pieces be evenly distributed across the width of the conveyer as well as with even product bed depth on the conveyer.

It is thus an object of the present invention to provide novel apparatus and methods for evenly distributing product across the width of the conveyer.

Another object of the invention is to provide novel apparatus and methods wherein even product distribution can be easily maintained even with variation of the product type and/or throughput rate. In this regard, an aim of the invention is to allow ease of adjustment preferably by remote electric control.

Yet another object of the invention is to eliminate the creation of pockets which can cause product clumping or agglomerates.

SUMMARY

Surprisingly, the above objectives can be satisfied in the field of product distribution on a conveyer by providing, in the preferred form, apparatus and methods of product distribution where a V-shaped plow having first and second legs interconnected at a steep angle in the order of less than 90° to each other is supported above the conveyer with the prow of the plow located in the product pile and with the first and second legs extending downstream on opposite sides of the product pile.

In another preferred aspect of the present invention, product distribution is accomplished by supporting a generally V-shaped plow at variable angular positions relative to the conveyer to conform to the variations in the type or condition of product and/or the throughput rate of the product being distributed across the width of the conveyer.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a partial, top plan view of an apparatus for distributing product along an endless conveyer according to the preferred teachings of the present invention, with alternate angular positions being partially shown in phantom.

FIG. 2 shows an enlarged cross sectional view of the apparatus of FIG. 1 according to section line 2—2 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "vertical", "horizontal", "inner", "downstream", and similar terms are used herein, it should be understood that these terms have reference only to the structure shown in the drawings as it would appear to a person viewing the drawings and are utilized only to facilitate describing the invention.

DESCRIPTION

An apparatus for evenly distributing product such as coated cereal pieces along an endless conveyer is shown in the drawings and generally designated 10. Apparatus 10 generally includes a protractor arc carrier 12 of a generally semicircular configuration or shape. In the preferred form, arc carrier 12 includes a horizontal, planar top 14 and a vertical, arcuate side 16 extending from the outside edge of top 14 at right angles thereto. The free ends of arc carrier 12 are connected to the opposite ends of a brace 18, with brace 18 having a pivot ear 20 located midway between its opposite ends and on the opposite side of brace 18 than arc carrier 12. Arc carrier 12 further includes first and second mounting blocks 22 secured such as by welding to the outer surface of side 16 at spaced locations generally equadistant on opposite sides of the center of arc carrier 12 and for purposes to be explained hereinafter.

Apparatus 10 further includes a V-shaped plow 24 including first and second, straight legs 26 and 28 having their first ends interconnected together at an interconnection and extending at a fixed, steep angle on the order of less than 90° and in the most preferred form at an angle of 84° to each other. Legs 26 and 28 have a length which is substantial in relation to the width of the conveyer and in the preferred form, each leg 26 and 28 has a length in the order of 70% of the width of the conveyer. Legs 26 and 28 are formed from and/or include a Teflon ® or similar coating to prevent sticking of the coated cereal pieces thereto. Legs 26 and 28 further include a frame portion 30 formed of angled material in the preferred form including a horizontal, planar top 32 and a vertical, planar side 34 extending from the outside edge of top 32 at right angles thereto. A pivot projection or boss 36 extends vertically upward from top 32 of leg 28. The inner surfaces of sides 34 of legs 26 and 28 are secured such as by screws to mounting blocks 22 of arc carrier 12, with arc carrier 12 being generally coplanar with frame portion 30 and secured between legs 26 and 28 of frame portion 30 on the downstream side of plow 24.

Apparatus 10 further includes means for supporting plow 24 above the conveyer with the first ends of legs 26 and 28 or in other words the prow of plow 24 located in the product pile on the conveyer and with legs 26 and 28 extending downstream on opposite sides of the product pile on the conveyer at an angle in the order of 48° to a perpendicular line across the width of the conveyer or in other words on the order of 138° to the longitudinal axis of the conveyer. Further, in the preferred form, the supporting means allow the angular positioning of plow 24 to be varied relative to the conveyer and particularly to conform to the variations in the product pile on the conveyer including but not limited to variations in the type of product and/or the throughput rate of the product being distributed across the width of the conveyer.

In the preferred form, protractor arc carrier 12 is movably supported and rests upon the supporting means for pivotal movement about the center of carrier 12, with the supporting means shown in the most preferred form as three arcuately or circumferentially spaced saddles 38. As best seen in FIG. 2, in this preferred form, saddles 38 each include an L-shaped member 40 including an L-shaped slide bearing 42 secured thereto. The bottom, horizontal surface of top 14 rests upon and is supported upon the horizontal surface of bearing 42 and the inner, free, vertical edge of top 14 abuts against the vertical surface of bearing 42 which is arcuate in shape corresponding to the arcuate shape of arc carrier 12. A horizontal pivot ear or lug 44 is secured to L-shaped member 40 on the side opposite bearing 42.

Referring back to FIG. 1, in the preferred form, apparatus 10 further includes a generally T-shaped support arm 46. Arm 46 includes a leg 48 which intersects generally perpendicularly with an elongated leg 50. The end of leg 48 opposite leg 50 includes a pivot ear 52, with pivot ears 20 and 52 being pivotally interconnected by pin 54. The other end of leg 48 includes a first pivot ear 56 positioned adjacent leg 50 on the side opposite pivot ear 52 and in line with leg 48. Leg 50 further includes second and third pivot ears 58 and 60 which are secured to leg 50 such as by flanges 62 at positions equally spaced from leg 48 and equally spaced from leg 50 on the side of leg 50 from which leg 48 extends. Pins 64 rotatably secure pivot ears 44 of saddles 38 to pivot ears 56, 58, and 60. In the most preferred form, the vertical location of pivot ears 44, 56, 58, and 60 are adjustable on pins 64 to allow adjustment of plow 24 to be parallel with the conveyer. For example, in the preferred form, pivot ears 44, 56, 58, and 60 are positioned between nuts threadably received on pins 64, with the vertical location of pivot ears 44, 56, 58, and 60 being adjustable by turning the nuts on pins 64.

Apparatus 10 further includes means for adjusting the angle of attack of plow 24, said means including a connector arm 66 pivotally connected to pivot boss 36 of plow 24. In the preferred form, connector arm 66 is secured to a linear actuator, not shown. Connector arm 66 is moved according to the centerline of the coated cereal pieces being deposited on the conveyer causing carrier 12 and plow 24 secured thereto to move along an arcuate path upon saddles 38 and vary the angular positioning of plow 24 relative to the conveyer and/or the angle of attack of plow 24. Particularly, the interconnection of the first ends of legs 26 and 28 of plow 24 define the prow of plow 24 and can be positioned at any one of a multiple of positions along an arc extending across the conveyer and having a center downstream of the interconnection, and in the preferred form, about the center of the semicircular shape of carrier 12. Apparatus 10 further includes suitable provisions, not shown, for raising and lowering support arm 46 generally parallel to the conveyer to adjust the height of legs 26 and 28 of plow 24 relative to the conveyer. In the preferred form, the linear actuator and height adjustment provisions are remotely, manually adjusted by actuation of electric switches. It may be possible to fully automate the adjustment by the use of sensors which sense the condition of the coated cereal product on the conveyer.

OPERATION OF THE INVENTION

It can then be appreciated with apparatus 10 operating according to the methods of the preferred teachings of the present invention, the coated cereal pieces spread quickly and evenly across the width of the conveyer due to the steep angle and the Teflon ® action of legs 26 and 28 of plow 24. Thus, coated cereal pieces are evenly distributed across the conveyer in both width and thickness to assure improved uniform drying of the cereal and without the creation of pockets which can cause product clumping or agglomerates. Further, in the event of variation of the product type and/or throughput rate or other processing variations, even adjustment can be easily maintained by varying the angular position of plow 24 relative to the conveyer. Furthermore, in addition to the improved, uniform drying of the product obtained as the result of the even distribution of product on the conveyer, the throughput rate of the product into the dryer and the dryer efficiency can be also dramatically increased when apparatus 10 and the methods of the present invention are utilized.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An apparatus for distributing a product pile across the width of a conveyer comprising, in combination: a V-shaped plow including first and second legs having their first ends interconnected together at an interconnection defined a prow, with the first and second legs each having a length which is substantial in relation to the width of the conveyer, with the first and second legs extending at a steep angle in the order of less than 90° to each other; and means for supporting the V-shaped plow above and at varying positions relative to the conveyer with the first ends of the first and second legs moveable in a direction across the width of the conveyer and located in the product pile and with the first and second legs extending downstream on opposite sides of the product pile; wherein the supporting means comprises means for varying the angular positioning of the V-shaped plow relative to the conveyer comprising means for moving the V-shaped plow along an arcuate path, with the prow traveling along an arc along a center downstream of the prow.

2. The apparatus of claim 1 wherein the first and second legs have their first ends interconnected together at a fixed angle.

3. An apparatus for distributing a product pile across the width of a conveyer comprising, in combination: a generally V-shaped plow including first and second legs having their first ends interconnected together at an interconnection forming a prow; and means for supporting the V-shaped plow above the conveyer at varying angular positions relative to the conveyer with the prow located in the product pile and with the first and second legs extending downstream on opposite sides of the product pile; wherein the varying means comprises means for moving the V-shaped plow along an arcuate path, with the prow traveling along an arc having a center downstream of the prow.

4. The apparatus of claim 3 wherein the moving means comprises a carrier of a generally semicircular shape having a center, with the carrier being secured between the first and second legs of the V-shaped plow on the downstream side of the V-shaped plow; and means for movably supporting the carrier for pivotal movement about the center of the carrier, with the center of the arcuate path and of the carrier being generally coaxial.

5. The apparatus of claim 4 wherein the movably supporting means comprises at least first and second saddles, with the carrier being slideably supported on the saddles, with the saddles being circumferentially spaced on the carrier.

6. The apparatus of claim 5 wherein the carrier includes a bottom horizontal surface and an inner, vertical edge, with the saddles comprising an L-shaped member having a horizontal, flat surface and a vertical, arcuate surface, with the bottom, horizontal surface of the carrier being slideably supported upon the horizontal, flat surface of the L-shaped member, with the arcuate surface of the L-shaped member corresponding to the semicircular shape of the carrier and abutting with the inner, vertical edge of the carrier.

7. The apparatus of claim 6 wherein the supporting means further comprises in combination: a support arm; and means for securing the saddles to the support arm.

8. The apparatus of claim 7 wherein the securing means comprises means for securing the saddles at adjustable vertical positions relative to the support arm.

9. The apparatus of claim 8 wherein the support arm is movable in a vertical direction relative to the conveyer.

10. The apparatus of claim 9 wherein each of the first and second legs have a length which is substantial in relation to the width of the conveyer; and wherein the first and second legs extend at a steep angle in the order of less than 90° to each other.

11. The apparatus of claim 4 wherein each of the first and second legs have a length which is substantial in relation to the width of the conveyer; and wherein the first and second legs extend at a steep angle in the order of less than 90° to each other.

12. A method for distributing a product pile moving downstream on a conveyer, with the conveyer having a width, comprising the steps of: providing a V-shaped plow including first and second legs each having their first ends interconnected together at an interconnection defining a prow; supporting the V-shaped plow above the conveyer to engage the product pile on the conveyer with the prow located in the product pile and with the first and second legs extending downstream on opposite sides of the product pile to direct product from the product pile laterally across the width of the conveyer; and varying the angular position of the V-shaped plow relative to the conveyer to evenly distribute the product across the width of the conveyer; wherein the varying step comprises the step of moving the V-shaped plow along an arcuate path, with the prow traveling along an arc having a center downstream of the prow.

13. The method of claim 12 wherein the providing step comprises the steps of providing a V-shaped plow, with the first and second legs each having a length which is substantial in relation to the width of the conveyer, with the first and second legs extending at a steep angle in the order of less than 90° to each other.

14. The method of claim 12 wherein the providing steps comprises the step of providing a V-shaped plow including first and second legs having their first ends interconnected together at a fixed angle.

* * * * *